(12) United States Patent
Yagi et al.

(10) Patent No.: US 8,651,221 B2
(45) Date of Patent: Feb. 18, 2014

(54) SADDLE RIDING TYPE VEHICLE

(71) Applicant: Yamaha Hatsudoki Kabushiki Kaisha, Shizuoka (JP)

(72) Inventors: Kyohei Yagi, Shizuoka (JP); Masato Endo, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 0 days.

(21) Appl. No.: 13/843,887

(22) Filed: Mar. 15, 2013

(65) Prior Publication Data

US 2013/0240285 A1    Sep. 19, 2013

(30) Foreign Application Priority Data

Mar. 15, 2012   (JP) ................. 2012-059332

(51) Int. Cl.
- *B62K 11/14* (2006.01)
- *B60K 26/04* (2006.01)
- *B60K 26/02* (2006.01)
- *B62K 23/04* (2006.01)

(52) U.S. Cl.
USPC .............................. 180/335; 180/219; 280/63

(58) Field of Classification Search
USPC ........... 180/335, 315, 9.25, 219, 218; 280/62, 280/63; 440/84, 87
See application file for complete search history.

(56) References Cited

U.S. PATENT DOCUMENTS

| | | | |
|---|---|---|---|
| 6,218,804 B1 * | 4/2001 | Toriyama et al. | 320/104 |
| 2012/0081220 A1 * | 4/2012 | Tamaki et al. | 340/435 |

FOREIGN PATENT DOCUMENTS

| | | | | |
|---|---|---|---|---|
| DE | 3822379 A1 * | 1/1990 | | B62K 11/14 |
| EP | 2281738 A2 | 2/2011 | | |
| JP | 11-310182 | 11/1999 | | |
| JP | 2000-53060 | 2/2000 | | |
| JP | 2000158252 A * | 6/2000 | | B23P 21/00 |
| JP | 3316885 B2 | 8/2002 | | |
| JP | 2010-132267 A | 6/2010 | | |
| JP | 2011-031819 A | 2/2011 | | |

* cited by examiner

*Primary Examiner* — Paul Dickson
*Assistant Examiner* — Keith Frisby
(74) *Attorney, Agent, or Firm* — Rabin & Berdo, P.C.

(57) ABSTRACT

A saddle riding type vehicle having a structure that supports a handle is provided. A handle cover includes first and second covers and a pulley cover. The first cover covers a front or rear part of a handle. The second cover covers the other side of the front or rear part of the handle. The pulley cover is provided in a space surrounded by the first and second covers. The first cover is provided with a pulley providing groove that covers a part of a pulley. The pulley is provided in the pulley providing groove. The pulley cover is provided on a side where the second cover is provided to the first cover. The pulley cover is attached to the first cover and covers the pulley together with the pulley providing groove.

12 Claims, 9 Drawing Sheets

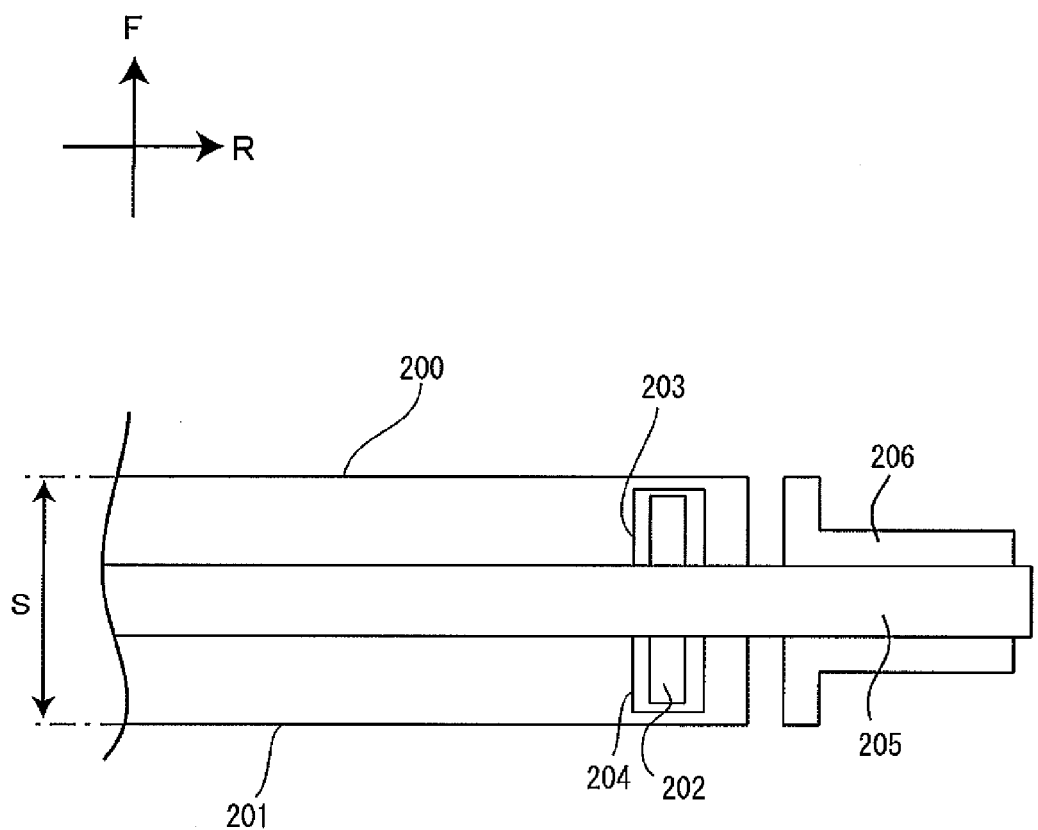

SADDLE RIDING TYPE VEHICLE

CROSS-REFERENCE TO RELATED APPLICATION

This application is based on, and claims priority to, Japanese Patent Application No. 2012-059332, filed on Mar. 15, 2012 the contents of which are incorporated herein by reference.

BACKGROUND

1. Technical Field

The present invention relates to a saddle riding type vehicle, and more specifically to a peripheral structure of a handle for a saddle riding type vehicle.

2. Description of the Background Art

A motorcycle is known as a kind of saddle riding type vehicle. The motorcycle has a handle provided with a grip. The grip is connected with a pulley. The pulley rotates together with the rotation of the grip. A throttle wire is laid on the pulley. The throttle wire is connected to a throttle valve provided at an intake device used to supply air to an engine.

When a rider turns the grip with respect to the handle, the pulley rotates with respect to the handle. The rotation of the pulley drives the throttle wire. When the throttle wire is driven, the throttle opening degree of the throttle valve is adjusted. A change in the throttle opening degree changes the speed of the motorcycle.

The motorcycle includes a switch case. A switch, such as a cell switch, is attached to the switch case. The pulley is stored in the switch case. The switch case is provided between a handle cover and the grip (see JP-A-2011-31819)

FIG. 8 is a partial schematic view showing a peripheral structure of the handle and the pulley in the motorcycle disclosed by JP-A-2011-31819. The arrow F in FIG. 8 indicates the forward direction of the vehicle. The arrow R in FIG. 8 indicates the rightward direction of the vehicle.

The motorcycle includes a front handle cover 101, a rear handle cover 102, a front switch cover 103, a rear switch cover 104, the handle 105, the grip 106, and the pulley 107. The front handle cover 101 covers a front part of the handle 105. The rear handle cover 102 covers a rear part of the handle 105. The front switch cover 103 is provided between the front handle cover 101 and the grip 106. The rear switch cover 104 is provided between the rear handle cover 102 and the grip 106. The pulley 107 is covered with the front switch cover 103 and the rear switch cover 104.

In the motorcycle disclosed by JP-A-2011-31819, the front handle cover 101, the rear handle cover 102, the front switch cover 103, and the rear switch cover 104 cover the handle 105 and the pulley 107. In the motorcycle disclosed by JP-A-2011-31819, many covers are used to cover the handle 105 and the pulley 107, which increases the size of the structure.

In some designs, a space may be provided to place a pulley at a handle cover instead of using a switch case. The handle normally has a curved part, and therefore its parts have varied precisions. Therefore, such a space used to provide a pulley at the handle cover lowers the accuracy of positioning the pulley with respect to the handle cover. Therefore, when a pulley is provided inside a handle cover, a pair of pulley covers is used to cover the pulley.

FIG. 9 shows a structure of how a pulley is provided in a handle cover. A grip 206 is attached to a handle 205. The pulley 202 is provided in a space covered with the front handle cover 200 and the rear handle cover 201. The pulley 202 has its front part covered with a front pulley cover 203. The pulley 202 has its rear part covered with a rear pulley cover 204.

Therefore, if a pulley is provided in a handle cover, several covers are still necessary to cover the handle and the pulley.

SUMMARY

It is an object of the present invention to provide a saddle riding type vehicle that allows a handle and a pulley to be covered with a reduced number of parts so that the structure does not have a large size and the accuracy of positioning the pulley with respect to the handle cover is not lowered.

A saddle riding type vehicle according to the present invention includes a vehicle body frame, an engine, a steering shaft, a handle, a handle cover, a grip, a pulley, and a throttle wire. The vehicle body frame includes a head pipe and a portion that extends towards a rear of the vehicle from the head pipe. The engine is supported by the vehicle body frame. The engine includes a combustion chamber and an intake throttle valve. The engine adjusts an amount of a fuel-air mixture to be supplied to the combustion chamber according to an opening degree of the intake throttle valve. A steering shaft is disposed within the head pipe and rotatable relative to the head pipe. A handle is fixed at an end of the steering shaft and extends in a vehicle-widthwise direction of the vehicle. A handle cover covers a central part of the handle in the vehicle-widthwise direction. A grip is attached to the handle at a position that is further away from a center of the vehicle in the vehicle-widthwise direction than a position of the handle cover. The grip is rotatable with respect to the handle. A pulley is attached to the handle at a position closer to the center of the vehicle in the vehicle-widthwise direction than a position of the grip. The pulley rotates with respect to the handle as the grip rotates with respect to the handle. A throttle wire is connected to the pulley. The throttle wire adjusts the opening degree of the intake throttle valve. The handle cover includes a first cover, a second cover and a pulley cover. The first cover covers one of a front and rear parts of the handle. The second cover covers the other of the front and the rear parts. The pulley cover is provided in a space surrounded by the first and second covers. The first cover is provided with a pulley providing groove that covers a part of the pulley. The pulley is provided in the pulley providing groove. The pulley cover is attached to the first cover and covers the pulley together with the pulley providing groove.

According to the invention, the pulley is covered with the pulley cover and the first cover. Therefore, the number of necessary parts can be reduced as compared to the case of covering using two pulley covers in addition to the handle cover. A space used to provide parts can be reduced by reducing the number of parts, so that a peripheral structure of the handle is made compact.

According to the invention, the position of the pulley can be adjusted by the pulley cover. Therefore, the accuracy of positioning the pulley with respect to the handle cover can be restrained from being lowered.

BRIEF DESCRIPTION OF THE DRAWINGS

FIG. 9 is a partial schematic view of an arrangement of a conventional handle and pulley.

DESCRIPTION OF THE EMBODIMENTS

Figure 8:
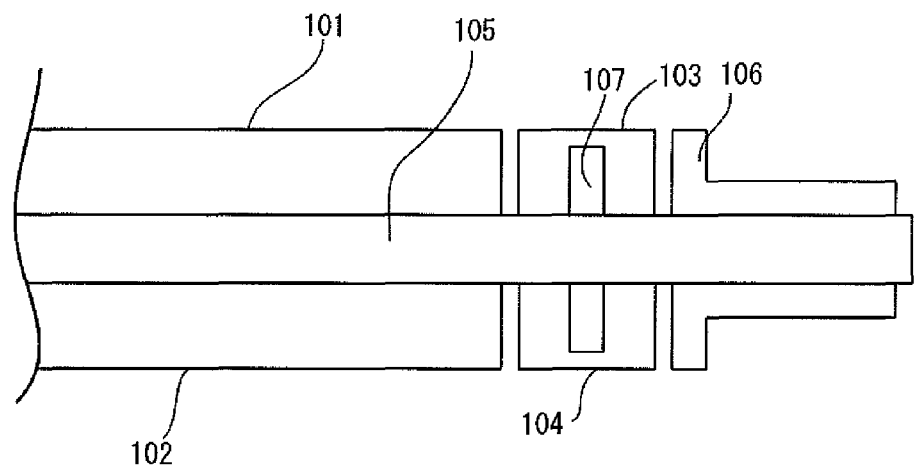
FIG. 8 is a partial schematic view of an arrangement of a conventional handle and pulley.

If a grip and a pulley are attached to a handle and the pulley is provided in a switch box, a switch case is necessary in addition to a handle cover. The handle cover and the switch case normally consist of a pair of members for front and rear parts of the handle. Therefore, as shown in FIG. 8, four members altogether are necessary to cover the handle and the pulley. The necessity for the four members complicates and expands a peripheral structure of the handle and the grip.

In some designs, as shown in FIG. 9, a space may be provided that is used to provide the pulley at the handle cover without using a switch case. The handle normally has a curved part and parts have varied precisions. Therefore, if such a space used to provide the pulley at the handle cover is provided, the accuracy of positioning the pulley with respect to the handle cover is lowered.

The inventor came up with an idea of covering one of the front and rear parts of the pulley with one of separated front and rear parts of the handle cover. One of the front and rear parts of the handle cover is capable of serving as a pulley cover and a handle cover. Therefore, according to the invention, the number of parts may be reduced. The inventor came up with an idea of covering the other of the front and rear parts of the pulley with the pulley cover. Therefore, according to the present invention, the position of the pulley with respect to the handle cover may be adjusted using the pulley cover. Therefore, the pulley can be positioned with respect to the handle cover with high accuracy.

Now, a motorcycle 1 according to one embodiment of the present invention will be described in conjunction with the accompanying drawings, in which the same or corresponding portions are designated by the same reference characters and their description will not be repeated. Note that the inner side in the vehicle widthwise direction refers to a direction toward the center of the vehicle in the vehicle widthwise direction. The outer side in the vehicle widthwise direction refers to a direction from the center of the vehicle to the left or right in the widthwise direction.

Overall Structure

Figure 1:
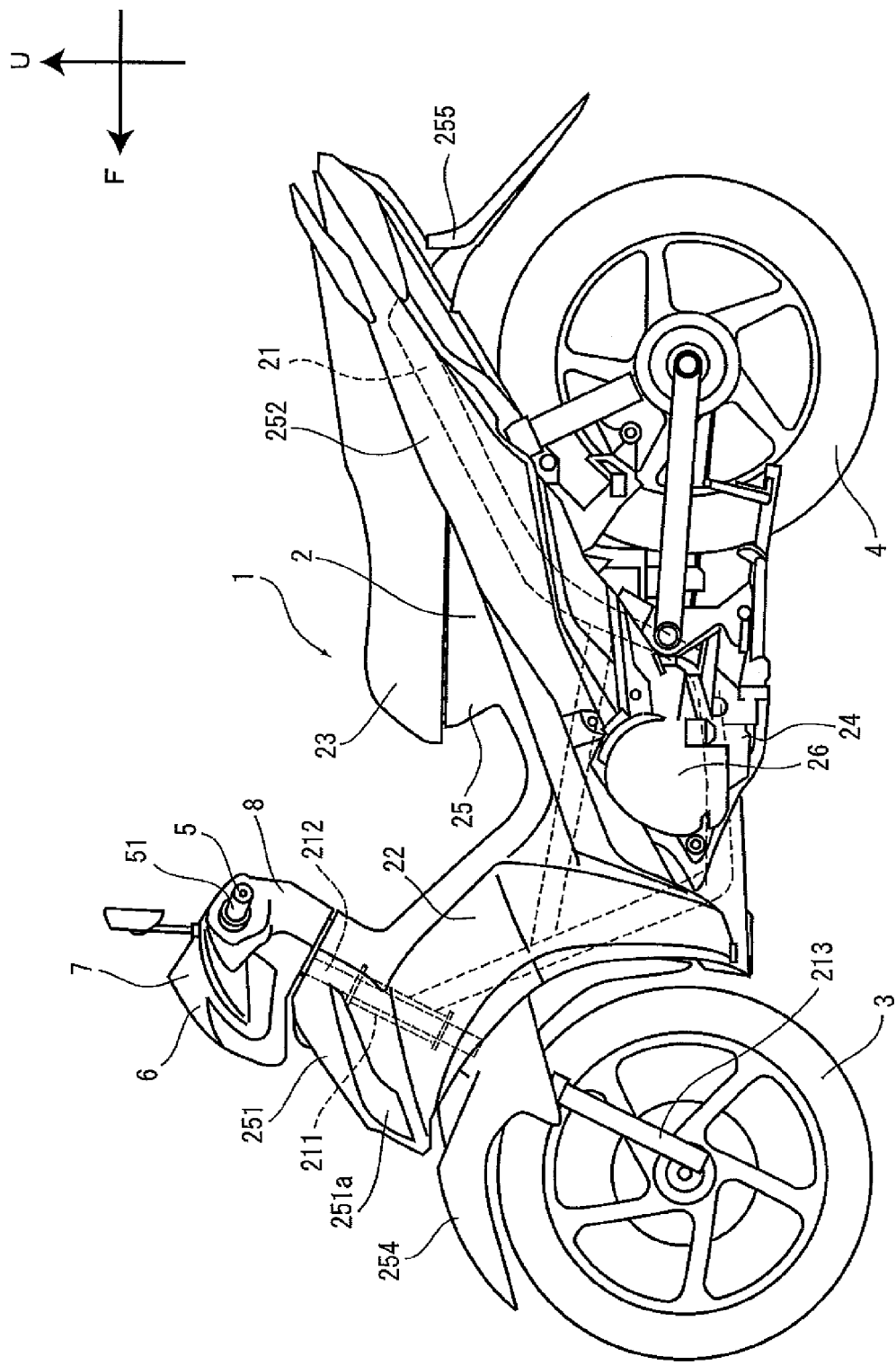
FIG. 1 is a left side view of a general structure of a motorcycle according to an embodiment of the present invention.

FIG. 1 is a general left side view of the motorcycle 1 according to the present invention. Note that in the following description, the front, back, left, and right refer to these directions as viewed by a rider seated on the seat of the motorcycle 1. In the following, the arrow F in FIGS. 1 to 6 indicates the forward direction of the motorcycle 1, the arrow U the upward direction, and the arrow R the rightward direction.

The motorcycle 1 has a vehicle main body 2, a front wheel 3, and a rear wheel 4.

The vehicle main body 2 mainly includes a vehicle body frame 21, a vehicle body cover 22, a handle 5, a seat 23, and a power unit 24.

The vehicle body frame 21 includes a head pipe 211. The head pipe 211 is provided in a front part of the vehicle body. The vehicle body frame 21 extends backward from the head pipe 211. The head pipe 211 has a steering shaft 212 inserted therein. The steering shaft 212 can be rotated relative to the head pipe 211. The steering shaft 212 has a lower part connected to a bracket that is not shown. The bracket supports a pair of front forks 213. The front wheel 3 is rotatably attached at lower ends of the pair of front forks 213. The handle 5 is attached to an upper end of the steering shaft 212. The vehicle body frame 21 and the steering shaft 212 are indicated by broken lines in FIG. 1.

The vehicle body frame 21 is entirely covered with the vehicle body cover 25. The vehicle body cover 25 is made of resin. The vehicle body cover 25 has a front cover 251, a side cover 252, a handle cover 6, a front fender 254, and a rear fender 255.

The front cover 251 is positioned ahead of the seat 23. The front cover 251 covers the head pipe 211. A position light 251a is provided at the front cover 251. The front cover 251 does not rotate with respect to the head pipe 211 when the handle 5 is rotated with respect to the head pipe 211.

The side cover 252 is provided at a rear part of the motorcycle 1. The side cover 252 is provided on the outer side of the vehicle frame 21 in the vehicle widthwise direction. The side cover 252 is provided inclined upward from the front to the back.

The handle cover 6 covers a part of the handle 5. The handle cover 6 is provided above the front cover 251. The handle cover 6 includes a front handle cover 7 and a rear handle cover 8. The front handle cover 7 covers a front part of the handle 5. The rear handle cover 8 covers a rear part of the handle 5. The handle cover 6 is not rotatable relative to the handle 5. The handle cover 6 rotates together with the rotation of the handle 5.

The front fender 254 is provided above the front wheel 3. The front fender 254 protrudes ahead of the front cover 251.

The rear fender 255 is provided above the rear wheel 4. The rear fender 255 is provided backward and inclined downward from a rear part of the vehicle body cover 21.

The handle 5 is provided ahead of the seat 23. The grip 51 is attached to the handle 5. The grip 51 is provided on the outer side of the handle cover 6 in the vehicle-widthwise direction.

A rider is seated on the seat 23. The seat 23 is supported at the vehicle body frame 21. The seat 23 is provided above the power unit 24.

The power unit 24 is provided in the vicinity of the rear wheel 4. A CVT case included in the power unit 24 is exposed from the vehicle body cover 25. The power unit 24 is supported at the vehicle body frame 21. The power unit 24 includes an engine 26 a mission device, and the like.

Figure 2:
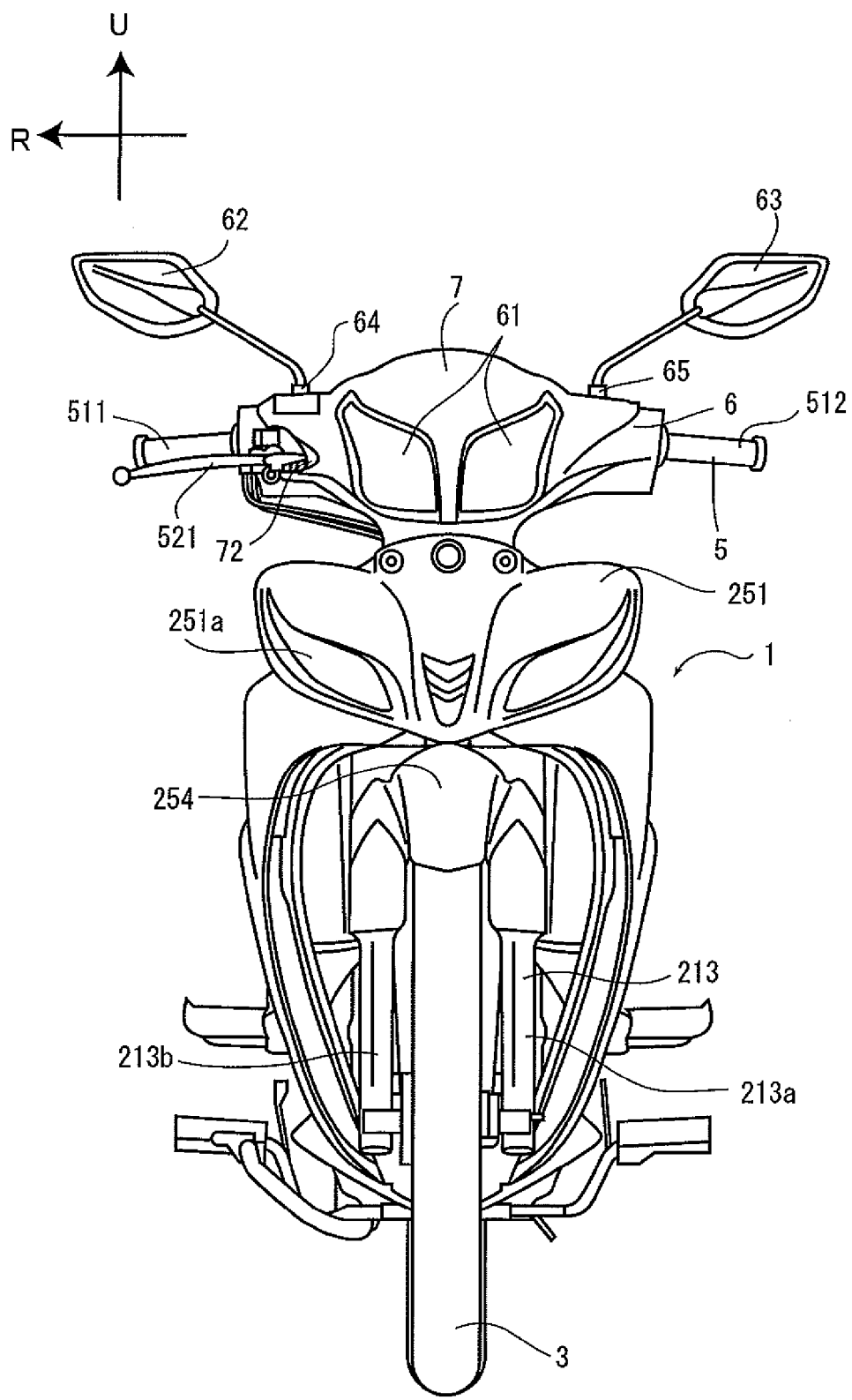
FIG. 2 is a general front view of the motorcycle.

FIG. 2 is a general front view of the motorcycle 1.

The front wheel 3 is held between a left front fork 213a and a right front fork 213b. The front fender 254 is provided above the front wheel 3. The left front fork 213a and the right front fork 213b extend in the up-down direction. The front cover 251 is provided above the front fender 254. The front cover 251 is provided with two position lights 251a.

The handle cover 6 is provided above the front cover 251. The handle cover 6 extends in the vehicle-widthwise direction. The handle cover 6 is provided with head lights 61. The handle cover 6 is provided with a right mirror 62 and a left mirror 63. The right mirror 62 is positioned more on the right side than the right head light 61. The right mirror 62 extends rightward from a first connection portion 64 connected to the handle cover 6. The left mirror 63 is positioned more on the left side than the left head light 61. The left mirror 63 extends leftward from a second connection portion 65 connected to the handle cover 6.

The front handle cover 7 is provided with an opening 72 at which a brake lever 521 is provided. The opening 72 is provided at a right end of the front handle cover 7. The handle 5 extends rightward from a right end of the handle cover 6. A right grip 511 is attached at a right end of the handle 5. The handle 5 extends leftward from a left end of the handle cover 6. A left grip 512 is attached at a left end of the handle 5.

Structure of Handle and Rear Handle Cover

Figure 3:
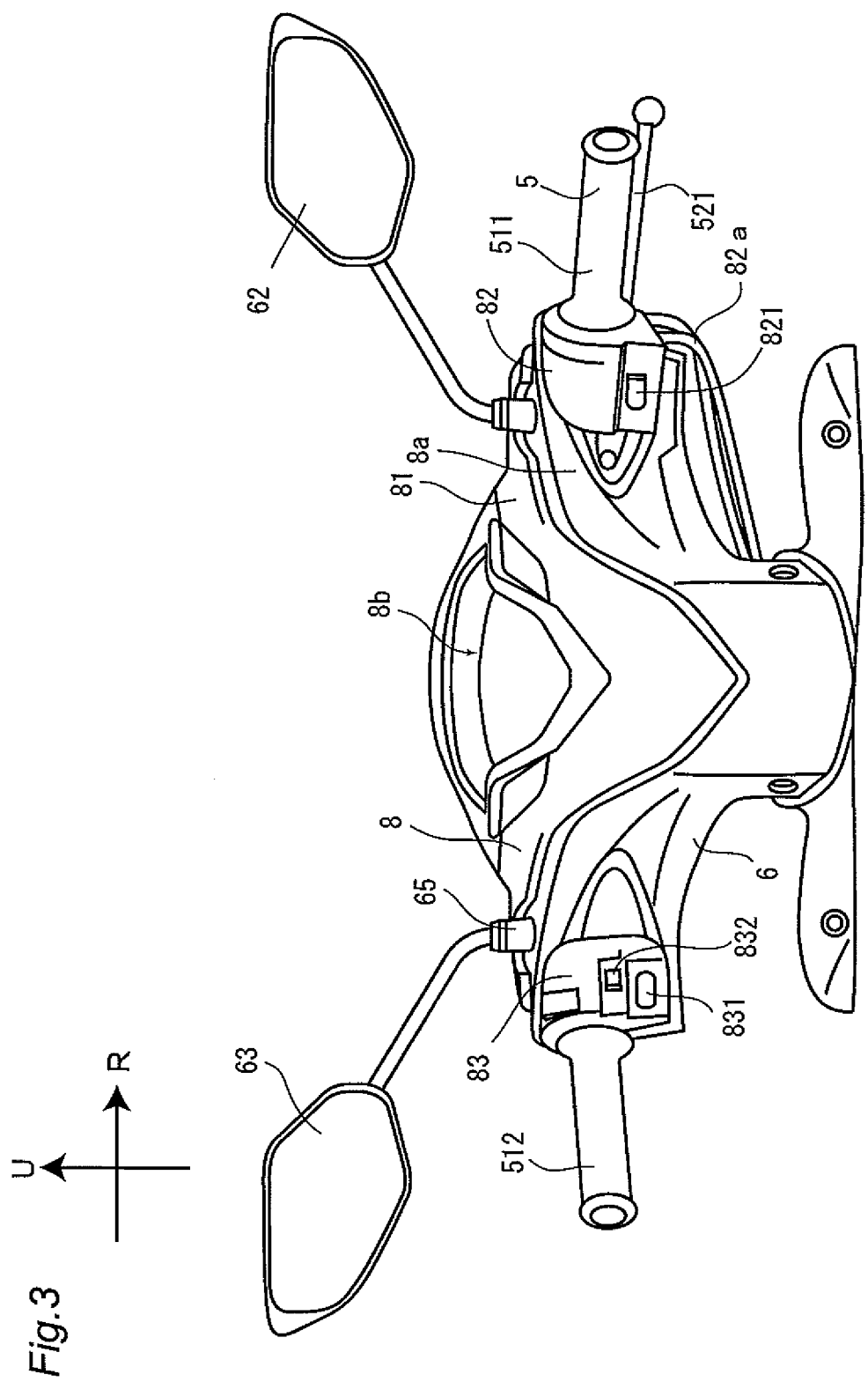
FIG. 3 is a partly enlarged view of a handle cover and a handle when viewed from behind.

FIG. 3 is a view of the handle 5 and handle cover 6 when viewed from behind.

The rear handle cover 8 includes a cover main body 8*a*, a meter cover 81, a first switch providing portion 82, and a second switch providing portion 83.

The cover main body 8*a* covers a rear part of the handle 5. The cover main body 8*a* covers a central part of the handle 5 in the vehicle-widthwise direction. A meter attachment portion 8*b* at which a meter such as a speed meter is provided is provided in the center of the cover main body 8*a* in the vehicle-widthwise direction. In FIG. 3, the meter or the like is removed from the meter attachment portion 8*b*.

The meter cover 81 is provided around the meter attachment portion 8*b*. The meter cover 81 is provided between the first switch providing portion 82 and the second switch providing portion 83. The meter cover 81 extends downward toward the center in the vehicle-widthwise direction.

The first switch providing portion 82 is provided at a right end of the rear handle cover 8. A first switch 821 is attached at the first switch providing portion 82. The first switch 821 is used to start the engine 26. The first switch providing portion 82 is a separate member from the cover main body 8*a*. The first switch providing portion 82 is provided in the vicinity of the right grip 511. A throttle wire 82*a* extends from a right end of the first switch providing portion 82. Two throttle wires 82*a* extend from the right end of the first switch providing portion 82. Note however that although the two throttle wires 82*a* are provided in the embodiment, the number of throttle wires is not limited to two according to the invention.

The second switch providing portion 83 is provided at a left end of the rear handle cover 8. Second and third switches 831 and 832 are attached to the second switch providing portion 83. The second switch 831 is used to turn on or off a direction indicator light. The second switch 831 is provided under the third switch 832. The third switch 832 is used to turn on or off the position light 251*a*. The second switch providing portion 83 is a separate member from the cover main body 8*a*. The second switch providing portion 83 is provided in the vicinity of the left grip 512.

Structure of Engine and etc.

Figure 4:
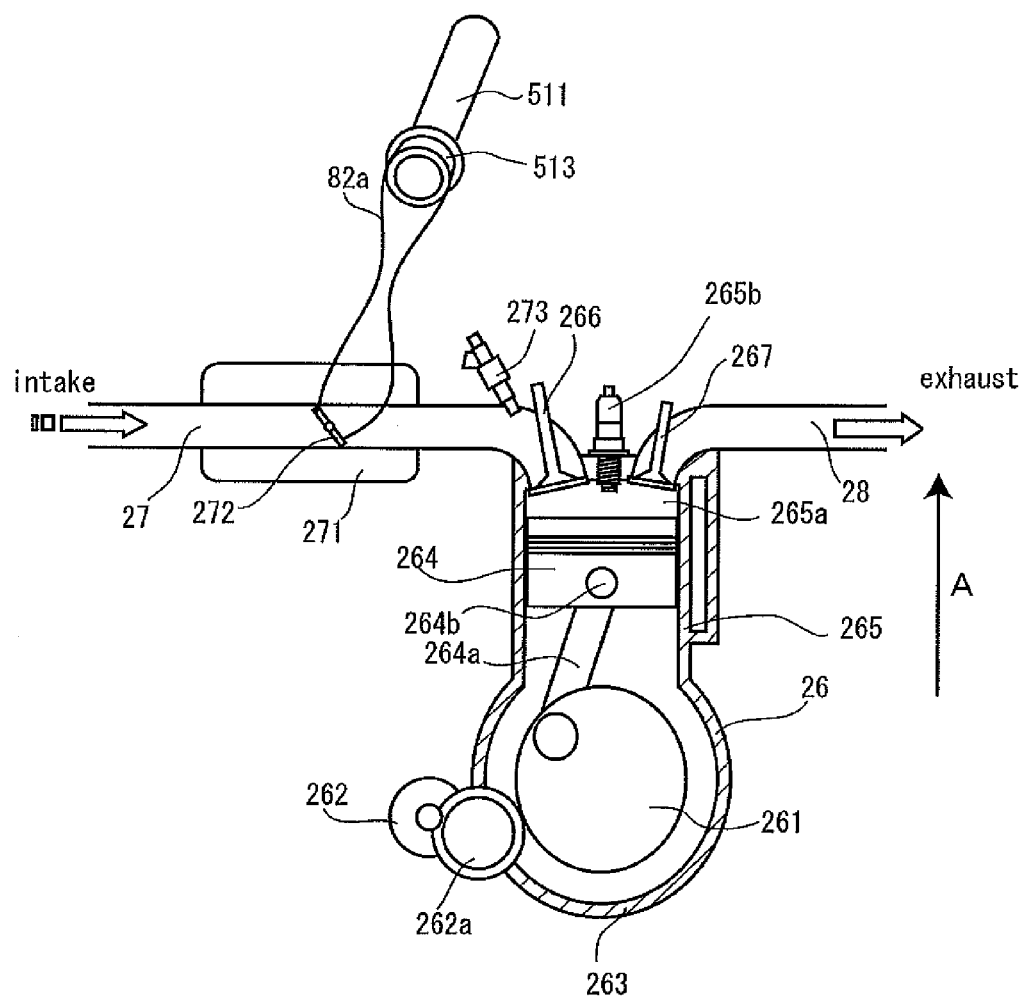
FIG. 4 is a schematic view of an engine, an intake port, and an exhaust port.

FIG. 4 is a partial schematic view of a peripheral structure of the engine 26.

The engine 26 includes a crankshaft 261, a starter motor 262, a crank case 263, a piston 264, a cylinder 265, an intake valve 266, and an exhaust valve 267.

The crankshaft 261 transmits motive power generated by the engine 26 to a mission device. The crankshaft 261 transforms reciprocating movement of the piston 264 into rotation movement. The crankshaft 261 extends in a direction orthogonal to the surface of the sheet of FIG. 4.

The starter motor 262 rotates with electric power by the operation of the first switch 821. The starter motor 262 is connected to the crankshaft 261 through a gear 262*a*. When the first switch 821 is pressed and the starter motor 262 rotates, the crankshaft 261 rotates.

The crankcase 263 stores the crankshaft 261 inside.

The piston 264 is connected to the crankshaft 261 through a connecting rod 264*a*. The piston 264 can reciprocate inside the cylinder 265. The piston 264 is connected to the connecting rod 264*a* through a piston pin 264*b*.

The cylinder 265 is attached to the crankcase 263. The cylinder 265 guides the piston 264. The cylinder 265 and the piston 264 form a combustion chamber 265*a*. The combustion chamber 265*a* is formed on the arrow A side of the cylinder 265. An ignition device 265*b* is attached to the combustion chamber 265*a*. The ignition device 256*b* ignites a fuel-air mixture in the combustion chamber 265*a*. A plurality of holes is provided at a tip end of the cylinder 265 on the arrow A side. The combustion chamber 265*a* is connected to an intake port 27 and an exhaust port 28 at its tip end on the arrow A side. The intake port 27 is provided with a throttle body 271 and a fuel supply device 273. The throttle body 271 includes a throttle valve 272. A pulley (not shown) used to rotate the throttle valve 272 is provided at the outer side of the throttle body 271. The throttle wire 82*a* is connected to the pulley that is not shown. When the pulley (not shown) is rotated through the throttle wire 82*a*, the throttle valve 272 turns. At the engine 26, the amount of fuel-air mixture to be supplied to the combustion chamber 265*a* is adjusted based on the opening degree of the throttle valve 272. The fuel supply device 273 supplies fuel to air inside the intake port 27. Fuel is supplied to air and a fuel-air mixture is formed in the intake port 27. The throttle wire 82*a* is wrapped around the pulley 513 connected to the right grip 511. The opening degree of the throttle valve 272 is adjusted as the throttle wire 82*a* is driven.

The intake valve 266 is driven when a fuel-air mixture is supplied into the combustion chamber 265*a*. The intake valve 266 is provided in a hole at a tip end of the cylinder 264.

The exhaust valve 267 is driven when fuel gas is fed from the combustion chamber 265*a*. The exhaust valve 267 is smaller than the intake valve 265. The exhaust valve 267 is provided at a hole at a tip end of the cylinder 264.

Handle in Handle Cover and Peripheral Structure of Brake Operation Device

Figure 5:
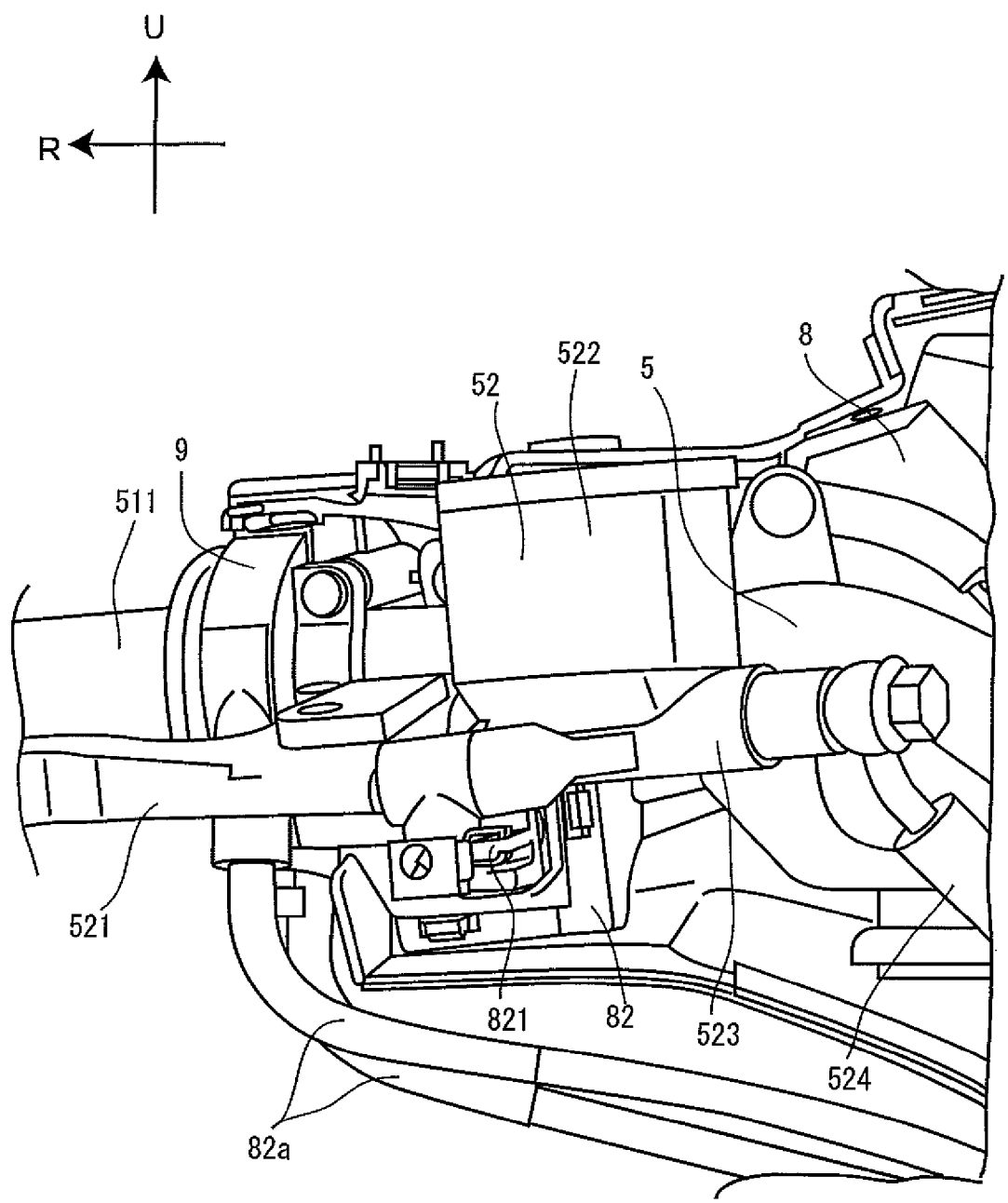
FIG. 5 is a partly enlarged view of a first switch providing portion removed of a front handle cover when viewed from the front.

FIG. 5 is a partly enlarged view of a periphery of the first switch providing portion 82 removed of the handle cover 7 when it is viewed from the front.

The brake operation device 52 is provided at a front part of the handle 5. The first switch 821 is provided under the handle 5.

The brake operation device 52 activates braking force on the front and rear wheels 3 and 4. The brake operation device 52 includes a brake lever 521, brake fluid 522, a master cylinder 523, and an oil tube 524.

The brake lever 521 is provided at a front part of the right grip 511. The brake lever 521 extends rightward from the inside of a space surrounded by the front handle cover 7 and the rear handle cover 8. The brake lever 521 extends to the right beyond the master cylinder 523.

The brake fluid 522 is connected to the master cylinder 523. The brake fluid 522 stores brake oil inside. The brake fluid 522 extends in the vehicle-widthwise direction. A brake piston that is not shown is provided inside the brake fluid 522, and the brake piston is moved when a rider operates the brake lever 521.

The master cylinder 523 stores brake oil inside. The brake oil can be moved between the master cylinder 523 and the brake fluid 522. The master cylinder 523 extends upward from the brake fluid 522.

The oil tube 524 is connected to a left end of the brake fluid 522. When a rider activates the brake lever 521, brake oil is supplied from the brake fluid 522 to the oil tube 524.

When the brake lever 521 is operated, brake oil in the brake fluid 522 moves toward the oil tube 524. When the brake oil moves to the side of the oil tube 524, the brake devices attached to the front wheel 3 and the rear wheel 4 activate braking force on the front wheel 3 and the rear wheel 4.

The handle 5 is provided behind the brake operation device 52. The right grip 511 and the pulley cover 9 are provided on the right side of the brake operation device 52. Two throttle wires 82a extend from the pulley cover 9. The pulley cover 9 is screwed to the first switch providing portion 82. The pulley cover 9 is made of resin.

Figure 6:
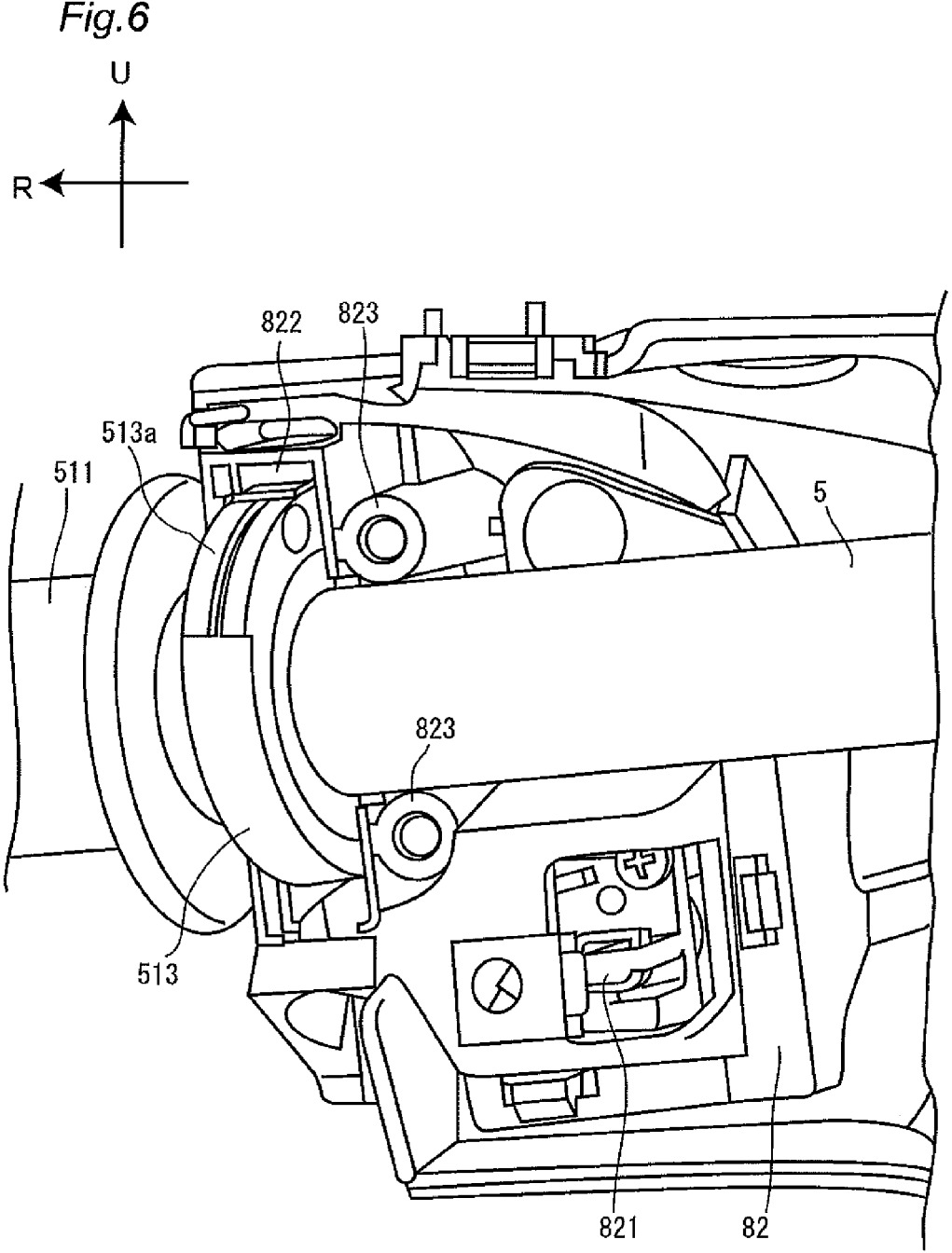
FIG. 6 is a partly enlarged view of a rear surface of the first switch providing portion and a structure of a handle and a right grip.

FIG. 6 is a partly enlarged view of a structure of a back surface of the first switch providing portion 82, the handle 5, and the right grip 511. FIG. 6 shows the state of FIG. 5 removed of the brake operation device 52 and the pulley cover 9.

The right grip 511 is attached to the handle 5. The right grip 511 is rotatable with respect to the handle 5. The pulley 513 is connected on a left side of the right grip 511. The pulley 513 is integrally formed with the right grip 511. The pulley 513 is attached at the handle 5. The pulley 513 is rotatable with respect to the handle. When the right grip 511 rotates with respect to the handle 5, the pulley 513 rotates with respect to the handle 5. The pulley 513 is provided with a wire support 513a. The wire support 513a supports the throttle wire 82a.

The first switch providing portion 82 supports the first switch 821. The first switch providing portion 82 includes a pulley providing groove 822. A part of the pulley 513 is provided at the pulley providing groove 822. The pulley providing groove 822 covers a rear part of the pulley 513. The pulley providing groove 822 has a width greater than the width of the pulley 9. The width of the pulley providing groove 822 is smaller than the width of the first switch 821. The pulley providing groove 822 is provided on the right side of the first switch 821. The pulley providing groove 822 is provided at a right end of the first switch providing portion 82. The first switch providing portion 82 includes a pair of fixing portions 823 for the pulley cover 9. The fixing portions 823 are adjacent to the pulley providing groove 822. The handle 5 is provided between the pair of fixing portions 823 in the up-down direction.

Operation

When a rider rotates the right grip 511 with respect to the handle 5, the pulley 513 rotates with respect to the handle 5 as the right grip 511 rotates. When the pulley 513 rotates with respect to the handle 5, the throttle valve 272 is opened through the throttle wires 82a. At the intake port 27, fuel is supplied to air by the fuel supply device 273 and a fuel-air mixture is produced. When the intake valve 266 is driven, the fuel-air mixture is supplied to the combustion chamber 265a. After the fuel-air mixture is supplied to the combustion chamber 265a, the piston 264 is positioned on a lower side. Then, the crankshaft 261 rotates and the piston 264 is raised. When the piston 264 moves to an upper side, the ignition device 265b ignites the fuel-air mixture in the combustion chamber 265a. Energy generated by burning the fuel-air mixture lowers the piston 264. As the piston 264 is lowered, the crankshaft 261 is rotated. Exhaust gas generated during the combustion of the fuel-air mixture in the combustion chamber 265a is discharged to the outside of the vehicle from the exhaust port 28.

Features of Embodiment

Now, features of the embodiment will be described.

According to the above-described embodiment, a space used to provide the pulley 513 is formed by a part of the rear handle cover 8 and the pulley cover 9. Therefore, the front handle cover 7, the rear handle cover 8, and the pulley cover 9 cover the handle 5 and the pulley 513. Therefore, the number of necessary parts can be reduced as compared to the arrangement shown in FIG. 8 in which the pulley is covered with the switch cover or pulley cover consisting of the two members for front and rear parts of the handle and the handle is covered with the two handle covers that separate the handle into the front and rear parts.

As shown in FIG. 8, when a pulley is provided in a switch case, a width necessary for providing the switch is generally larger than a width necessary for providing the pulley, and therefore the switch case has a width greater than the width necessary for providing the pulley. Therefore, the switch case has an extra unnecessary space around the pulley 513. According to the above-described embodiment, however, the first switch 821 is provided at the first switch providing portion 82 included in the rear handle cover 8. Therefore, there is no such wasted space around the pulley 513. Therefore, according to the above-described embodiment, other parts may be provided around the pulley 513, so that the cover for the handle 5 and the pulley 513 can be reduced in size.

According to the embodiment, the pulley providing groove 822 is provided at the rear handle cover 8. Therefore, after the pulley 513 and the handle 5 are attached to the rear handle cover 8, the front handle cover 7 is attached to the rear handle cover 8. Here, many electronic parts such as the meter and the first switch 821 are attached to the rear handle cover 8. On the other hand, an electronic device attached to the front handle cover 7 is only the head light 61. Therefore, in the motorcycle 1 according to the above-described embodiment, wirings for electronic parts may be connected to a power supply more easily after the rear handle cover 8 is fixed to the front handle cover 7, which makes it easier to assemble the motorcycle 1.

According to the above-described embodiment, the pulley providing groove 822 is provided at the first switch providing portion 82. Since the first switch providing portion 82 and the cover main body 8a can be produced separately, the pulley providing portion 822 can be formed with higher precision.

According to the above-described embodiment, the pulley providing groove 822 is provided on a right end of the rear handle cover 8, and therefore a sufficient space for providing the brake operation device 52 and the like can be secured. Providing the brake operation device 52 in the vicinity of the pulley 513 eliminates a wasted space around the pulley 513. Therefore, a peripheral structure of the pulley 513 can be made compact.

According to the above-described embodiment, the first switch 821 is provided on the left side of the pulley providing groove 822. Therefore, if the first switch 821 has a large width, the pulley 513 does not prevent the first switch 821 from being provided.

According to the above-described embodiment, the first switch providing portion 82 is provided on a right end of the rear handle cover 8 and the pulley providing groove 822 is provided on a right end of the first switch providing portion 82. Therefore, a space that can be used to provide the master cylinder 523 can be secured easily on the left side of the pulley 513.

According to the above-described embodiment, the first switch 821 has a width greater than the width of the pulley providing groove 822. Since the first switch 821 is provided at the rear handle cover 8, a compact structure can be obtained as compared to the case of using a switch case.

Figure 7:
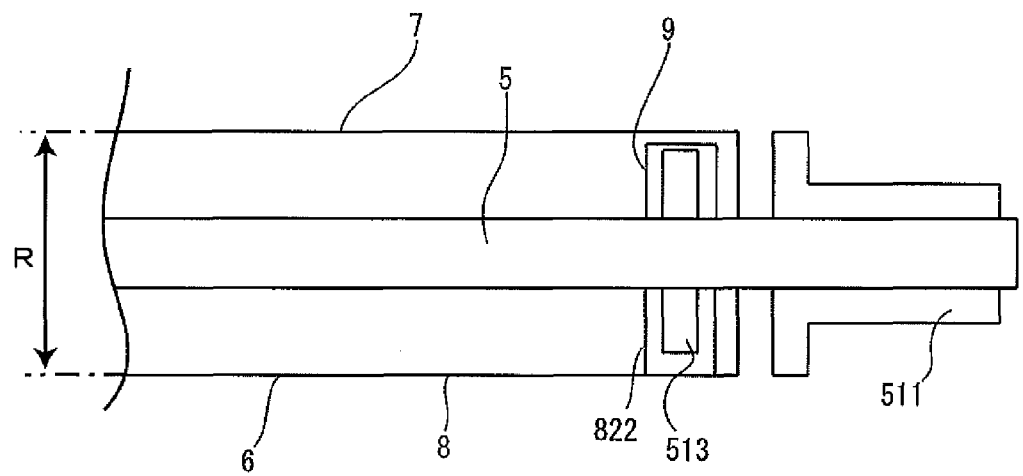
FIG. 7 is a partial schematic view showing an example of how a handle and a pulley according to the present invention are arranged.

The known arrangement shown in FIG. 9 has the two pulley covers 203 and 204 used to cover the pulley 202 in a space covered with the front handle cover 200 and the rear handle cover 201. FIG. 7 is a schematic view of a structure according to the above-described embodiment in which the handle 5 and the pulley 513 are covered with the handle cover 6 and the pulley cover 9. The space covered with the front handle cover 7 and the rear handle cover 8 refers to a space between the front handle cover 7 and the rear handle cover 8. Stated differently, the space refers to all locations where the front cover 7 is provided on the front side and the rear handle cover 8 is provided on the rear side. As for a location where the front handle cover 7 and the rear handle cover 8 have an opening, a space that would otherwise be covered with the front handle cover 7 and the rear handle cover 8 if not for the opening is included in the space covered with the front handle cover 7 and the rear handle cover 8.

According to the above-described embodiment, the pulley cover 9 is provided in a space formed by the front handle cover 7 and the rear handle cover 8. According to the embodiment, since a cover or the like is not provided between the pulley 513 and the rear handle cover 8, the handle cover 6 has a width R smaller than the width S of the handle cover according to the known arrangement (FIG. 9). If the meter and the first switch are to be provided in the same positions as those of the known arrangement, the handle cover for example must be increased in size. If the handle cover has a larger size, its strength may be reduced, while the meter cover 81 is attached to the rear handle cover 8 according to the above-described embodiment. Therefore, if the handle cover 6 has an increased size, its strength can be prevented from being lowered.

Other Embodiments

The above-described embodiment relates to a motorcycle, but the present invention may be applied to a three- or four-wheeled saddle riding type vehicle. The present invention is also applicable to various other kinds of motorcycles. The present invention is for example applicable to a scooter type or underbone type motorcycle.

According to the above-described embodiment, the pulley providing groove is formed at the rear handle cover, but the position is not limited to this according to the present invention. The pulley providing groove may be formed at the front handle cover. In view of assemblability, it is preferable to form a pulley providing groove at the rear handle cover but a pulley providing groove may be provided at the front handle cover depending on how wirings are arranged for electronic parts.

According to the above-described embodiment, the first switch providing portion and the rear handle cover are separate parts, but the invention is not limited to this arrangement. The first switch providing portion and the rear handle cover may be formed in an integral form. If the first switch providing portion is formed as a discrete member from the rear handle cover, the first switch providing portion may be formed easily, and particularly the pulley providing groove that requires high precision can be formed more easily.

According to the above-described embodiment, the meter cover is attached to the rear handle cover, but the invention is not limited to this arrangement. The meter cover does not have to be attached to the rear handle cover.

According to the above-described embodiment, the throttle wires 82a are connected to the throttle valve 272, but the invention is not limited to this arrangement. For example, the throttle wires 82a may be connected with an ECU and the throttle valve 272 may be controlled by driving a motor in response to a signal generated by the ECU.

According to the above-described embodiment, the right grip 511 and the pulley 513 are formed from a single member, but the invention is not limited to this arrangement. The right grip and the pulley may be separate members and connected so that the pulley rotates as the right grip rotates.

According to the embodiment, two throttle wires are used to adjust the opening degree of the throttle valve, but the invention is not limited to this arrangement. A single throttle wire may be used to adjust the opening degree of the throttle valve.

According to the above-described embodiment, the first switch 821 is a cell switch, but the invention is not limited to this arrangement. The first switch 821 may be a switch that switches between on and off states of a head light, a direction indicator light or the like.

What is claimed is:

1. A saddle riding type vehicle, comprising:
a vehicle body frame including a head pipe and a portion that extends towards a rear of the vehicle from the head pipe;
an engine supported by the vehicle body frame, the engine including a combustion chamber and an intake throttle valve,
wherein the engine adjusts an amount of a fuel-air mixture to be supplied to the combustion chamber according to an opening degree of the intake throttle valve;
a steering shaft disposed within the head pipe and rotatable relative to the head pipe;
a handle fixed at an end of the steering shaft and extending in a vehicle-widthwise direction of the vehicle;
a handle cover that covers a central part of the handle in the vehicle-widthwise direction;
a grip attached to the handle at a position that is further away from a center of the vehicle in the vehicle-widthwise direction than a position of the handle cover, the grip being rotatable with respect to the handle;
a pulley attached to the handle at a position closer to the center of the vehicle in the vehicle-widthwise direction than a position of the grip,
wherein the pulley rotates with respect to the handle as the grip rotates with respect to the handle; and
a throttle wire connected to the pulley, the throttle wire adjusting the opening degree of the intake throttle valve, wherein
the handle cover includes a first cover, a second cover and a pulley cover,
the first cover covers one of a front and rear parts of the handle,
the second cover covers the other of the front and the rear parts of the handle,
the pulley cover is provided in a space surrounded by the first and second covers,
the first cover is provided with a pulley providing groove that covers a part of the pulley,
the pulley is provided in the pulley providing groove,
the pulley cover is attached to the first cover and covers the pulley together with the pulley providing groove.

2. The saddle riding type vehicle according to claim 1, further comprising a switch for starting the engine,
wherein one of the first and second covers is a rear cover that is disposed closer to the rear of the vehicle than the other of the first and second covers and is provided with the switch.

3. The saddle riding type vehicle according to claim 2, further comprising a head light attached to the second cover, wherein the first cover is the rear cover and covers the rear part of the handle, the switch is provided at the first cover, the second cover covers the front part of the handle.

4. The saddle riding type vehicle according to claim 3, wherein the first cover comprises a switch providing portion attached directly to the switch, and the pulley providing groove is provided at the switch providing portion.

5. The saddle riding type vehicle according to claim 4, wherein the switch providing portion is provided at an outer end of the first cover that is farther away from the center of the vehicle in the vehicle-widthwise direction than an inner end of the first cover, and the pulley providing groove is provided further outward from the center in the vehicle-widthwise direction than the switch.

6. The saddle riding type vehicle according to claim 4, further comprising:

front and rear wheels; and a brake operation device that activates a braking force on the front and rear wheels, wherein the brake operation device comprises a master cylinder, and the master cylinder is provided closer to the center of the vehicle in the vehicle-widthwise direction than the pulley.

7. The saddle riding type vehicle according to claim 6, wherein the brake operation device comprises a brake lever, and the brake lever extends outward and away from the center in the vehicle widthwise direction from inside a space surrounded by the first and second covers so that a part of the brake lever is not enclosed by the first and second covers.

8. The saddle riding type vehicle according to claim 2, wherein the switch has a width that is larger than a width of the pulley providing groove.

9. The saddle riding type vehicle according to claim 2, further comprising a meter, and wherein the first cover further comprises a meter attaching portion, that has the meter directly attached to a portion thereof, and a meter cover that covers both the portion of the meter attaching portion at which the meter is directly attached and a periphery of the meter attaching portion that is not directly attached to the meter.

10. The saddle riding type vehicle according to claim 2, wherein the switch is provided under the handle.

11. The saddle riding type vehicle according to claim 2, wherein the switch is disposed closer to the engine than the handle.

12. The saddle riding type vehicle according to claim 1, wherein the pulley cover is formed of resin.

* * * * *